(12) United States Patent
Sone

(10) Patent No.: US 6,487,205 B1
(45) Date of Patent: Nov. 26, 2002

(54) METHOD AND SYSTEM FOR TRANSMITTING VOICE CELL

(75) Inventor: Yukio Sone, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/271,646

(22) Filed: Mar. 18, 1999

(30) Foreign Application Priority Data

Mar. 19, 1998 (JP) .......................................... 10-069178

(51) Int. Cl.[7] .............................................. H04L 12/56
(52) U.S. Cl. ..................... 370/395.1; 370/474; 370/476
(58) Field of Search ................................. 370/230, 235, 370/298, 300, 310.1, 352, 395.1, 395.3, 395.4, 395.6, 395.64, 412, 414, 429, 435, 471, 474, 476

(56) References Cited

U.S. PATENT DOCUMENTS

| | | | | |
|---|---|---|---|---|
| 5,327,421 A | * | 7/1994 | Hiller et al. ................ | 370/60.1 |
| 5,526,353 A | * | 6/1996 | Henley et al. .............. | 370/60.1 |
| 5,654,964 A | * | 8/1997 | Wake ........................ | 370/395 |
| 5,802,051 A | * | 9/1998 | Petersen et al. ............ | 370/395 |
| 5,920,559 A | * | 7/1999 | Awaji ........................ | 370/392 |
| 6,118,763 A | * | 9/2000 | Trumbull .................... | 370/231 |
| 6,128,301 A | * | 10/2000 | Bernstein ................... | 370/396 |
| 6,130,888 A | * | 10/2000 | Tsuboya et al. ............ | 370/395 |
| 6,345,056 B1 | * | 2/2002 | Bharucha et al. .......... | 370/474 |

* cited by examiner

Primary Examiner—Hassan Kizou
Assistant Examiner—Anh-Vu H Ly
(74) Attorney, Agent, or Firm—Katten Muchin Zavis Rosenman

(57) ABSTRACT

A voice cell transmission method by which a VTOA architecture is employed and the transmission delay time can be minimized when transmitting the voice cell, and a system using the method are provided. Voice transmission method, in an ATM transmission system for transmitting a voice traffic, which is compressed, and is provided on a payload of a standard cell in a short cell format, comprising the steps of forming voice frames in every predetermined period of a talk-spurt of one voice channel, and providing the formed voice frames continuously on the payload of the standard cell. In a detailed example, a number of the voice frames of the one voice channel provided on the standard cell are dynamically varied according to a status of the network.

14 Claims, 14 Drawing Sheets

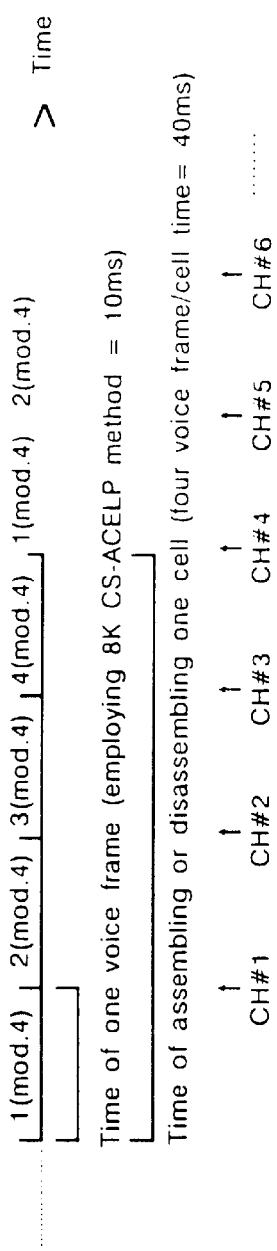
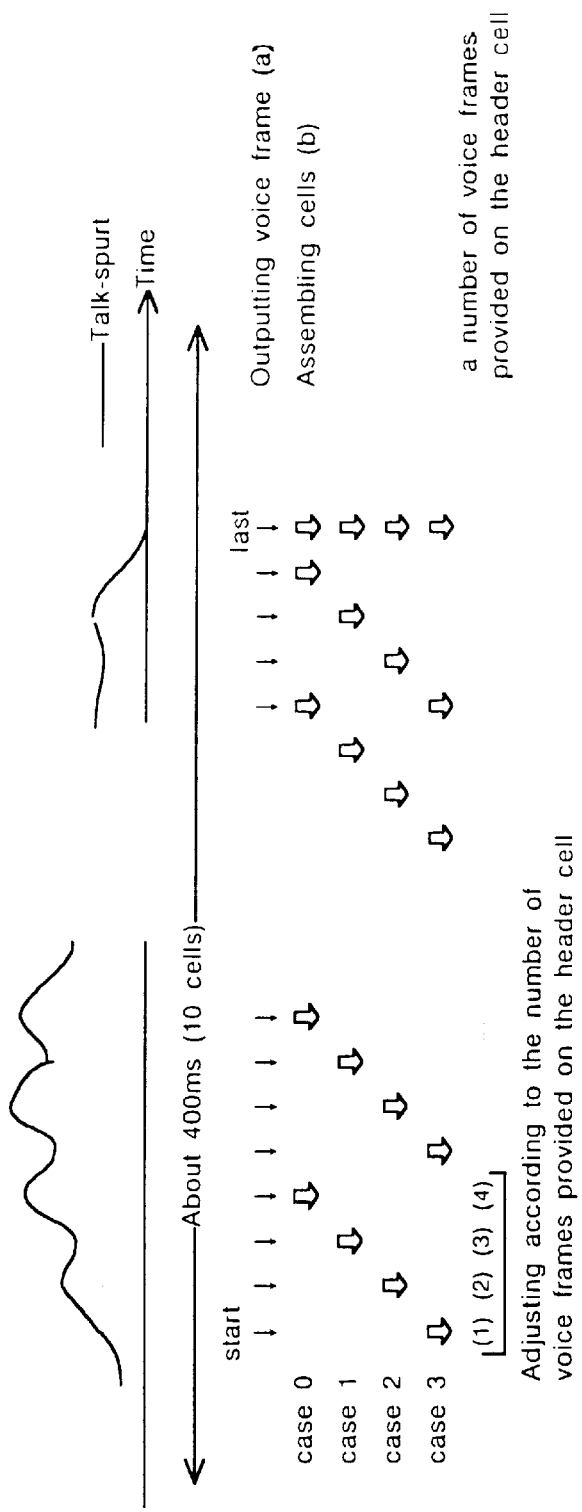
FIG. 7A
FIG. 7B

A transmission timing determining table (Fixed)

A transmission timing determining table (4× multiplexed number)

METHOD AND SYSTEM FOR TRANSMITTING VOICE CELL

BACKGROUND OF THE INVENTION

1. Field of the Invention

The present invention relates to a voice cell transmission method and a system using the method. More particularly, it relates to a voice cell transmission method by which voice cells can be effectively transmitted when transmitting compressed voice traffics through an ATM (Asynchronous transfer mode) network.

2. Description of the Related Art

Recent business networks have the feature such that an ATM technique is used, even in private networks employing the speed of around 1.5 Mbps, and inter-LANs communication and voice traffics are available by a so called low-speed ATM network. In this way, it has been greatly expected to construct an ATM integrated network system where all traffics are carried in even one network.

Especially, there have been various expectations relating to voice traffics. For example, it is expected to obtain high quality equivalent to that of the conventional communication system in an aspect, but to compress voice communication bands by employing a high compression technique, i.e., to reduce communication costs rather than the voice quality in another aspect.

As is typically shown in FIG. 20, a system accomplishing the former expectation may cause influences on the voice quality due to the reduction of the band width used when replacing a conventional TDM net work with a new network. The system accomplishing the latter expectation would influence to increase the transmission delay when pursuing convenience than the tone quality as a result of increasing users of cellar phones in recent years.

Therefore, there was a demand to provide a network, by which these expectations can be flexibly accomplished.

To cope with the above-described expectations, there are two kinds of conventional techniques: the first one is a circuit emulation service (CES); and the second one is a voice and telephony over ATM technique (VTOA). FIG. 21 shows an explanation diagram of the circuit emulation service. In this technique, a constant bit rate (CBR) transmission is possible by assembling a PCM digital voice signal of 64 Kbps into a cell signal, as it is.

A feature of this technique is to provide a communication quality almost equivalent to a time division multiplexing (TDM) transmission method, because of the low speed transmission delay. However, it is technically difficult to introduce a voice compression technique, especially, a soundless compression technique. Therefore, it causes a problem from a view point of efficiently using communication bands.

On the other hand, in the second technique, i.e., the VTOA technique, a short cell format is prescribed for each of plural communication channels, as shown in FIG. 22. In FIG. 22, the short cell format consists of a channel number CN to which the short cell is belonging, and voice signal data VSD, for example.

Further, the short cells generated from the plural communication channels are multiplexed, the multiplexed short cells are provided on a payload of 48 octets, and a header H and a control section C, which indicates how many short cells are included are added. Accordingly, a standard ATM cell can be constructed, having a format recommended by ITU-T or ATM forum.

In here, it is assumed to concentrate plural voice channels in a payload of one standard cell. However, in a network for such a general private company as having a voice data source of several channels, a probability of concentrating traffics to one route is low. Therefore, it is difficult to expect an efficiency of multiplexing in a payload of the standard cell.

As described above, when considering a voice and data integrated ATM network for general people, the number of voice channels is small, especially, in a small-scaled location. Therefore, it is not effective to use an architecture, in which plural channels are provided in one standard ATM cell, such as VTOA. On the other hand, when making only one channel into a cell, a time required to assemble the channel into a cell is increased, and therefore, it becomes difficult to cope with the limitation of delay time in a network.

SUMMARY OF THE INVENTION

Accordingly, it is an object of the present invention to provide a voice cell transmission method employing the VTOA architecture to minimize the transmission delay time when transmitting the voice cells.

To achieve the above-described object of the present invention, it can be realized by a voice transmission method, in an ATM transmission system for transmitting a voice traffic, which is compressed, and is provided on a payload of a standard cell in a short cell format, comprising the steps of forming voice frames in every predetermined period of a talk-spurt of one voice channel, and providing the formed voice frames continuously on the payload of the standard cell.

In one preferred mode of the present invention, a number of the voice frames of the one voice channel provided on the standard cell are dynamically varied according to a status of the network.

Alternatively, in other preferred mode of the present invention, when communications for plural voice channels are performed, a number of the voice frames provided on the payload of the standard cell including a header frame of the talk-spurt is differed in each of the plural voice channels.

Further, in one mode of the present invention, a number of the voice frames provided on the payload of the standard cell is fixed in each of the plural voice channels.

Furthermore, in other mode of the present invention, a number of the voice frames provided on the payload of the standard cell in each of the plural voice channels is differed in every talk-spurt.

Additionally, in other mode of the present invention, when the voice frames include an end voice frame, and there are extra spaces for providing voice frames on the payload of the standard cell, standard cells of other voice channels are not taken preference.

In one mode of the present invention, a number of the voice frames corresponding to one voice channel provided on one standard cell is dynamically varied according to priority of a specific call.

In addition to the above-described explanation, other objects of the present invention become clear by the description for explaining embodiments according to the attached drawings, in addition to the above-described explanations.

BRIEF DESCRIPTION OF THE DRAWINGS

FIGS. 7A and 7B are diagrams for explaining a feature of the present invention, in which a number of voice frames provided on the first cell in each voice frame.

DESCRIPTION OF THE PREFERRED EMBODIMENTS

Figure 1:
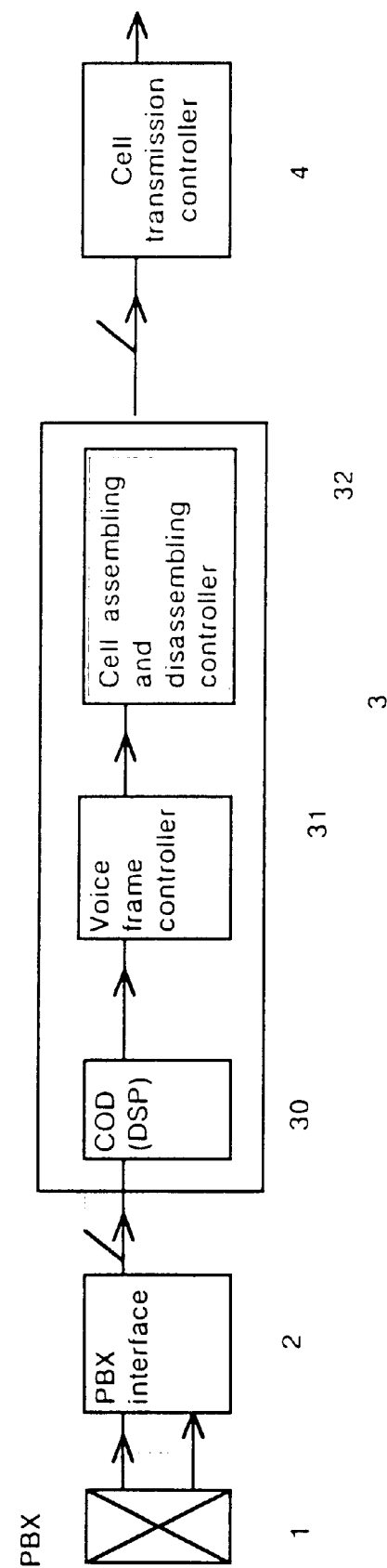
FIG. 1 is a structural block diagram of a first embodiment of a voice cell transmission method according to the present invention.

Embodiments of the present invention will be now explained in accompanying with drawings and, throughout the following descriptions, the same reference numerals are used to denote and identify corresponding or identical components in the diagrams. FIG. 1 is a structural block diagram of a first embodiment of a voice cell transmission method according to the present invention.

A PBX exchange 1 outputs analog/digital trunk lines and a PBX interface 2 terminates them. The PBX interface 2 further outputs a pulse code modulation (PCM) voice signal corresponding to each channel.

In FIG. 1, the system includes plural cell assembling and disassembling circuits 3 to 3n corresponding to channels. The PBX interface 2 inputs the PCM voice signal of the channel to each of the assembling and disassembling circuits 3 to 3n. Each of the plural cell assembling and disassembling circuits 3 to 3n has a common structure, and includes a compression coder 30 composed of a digital signal processor (DPS) or the like.

The compression coder 30 compresses voice data or soundless data, according to a compression method, such as (8K CS-ACELP) or (16K LD-CELP). The data compression is executed in every 10 ms of one voice signal in case of 8K CS-ACELP, and one voice frame is constituted with data of 10 bytes.

Further, the compression coder 30 is controlled by a voice frame controller 31. The voice frame controller 31 indicates a frame length and a header and an end of the frame in the voice frame output from the compression coder 30 and takes over processes to the cell assembling and disassembling controller 32.

The cell assembling and disassembling controller 32 assembles the output voice frames into a cell. In other words, the cell assembling and disassembling controller 32 sets the voice frame in a payload of a standard cell with a cell header or control information.

Then, a cell transmission controller 4 receives and transmits cell outputs of the voice channels of the cell assembling and disassembling circuits 3 to 3n, and controls to transmit them.

Figure 2:
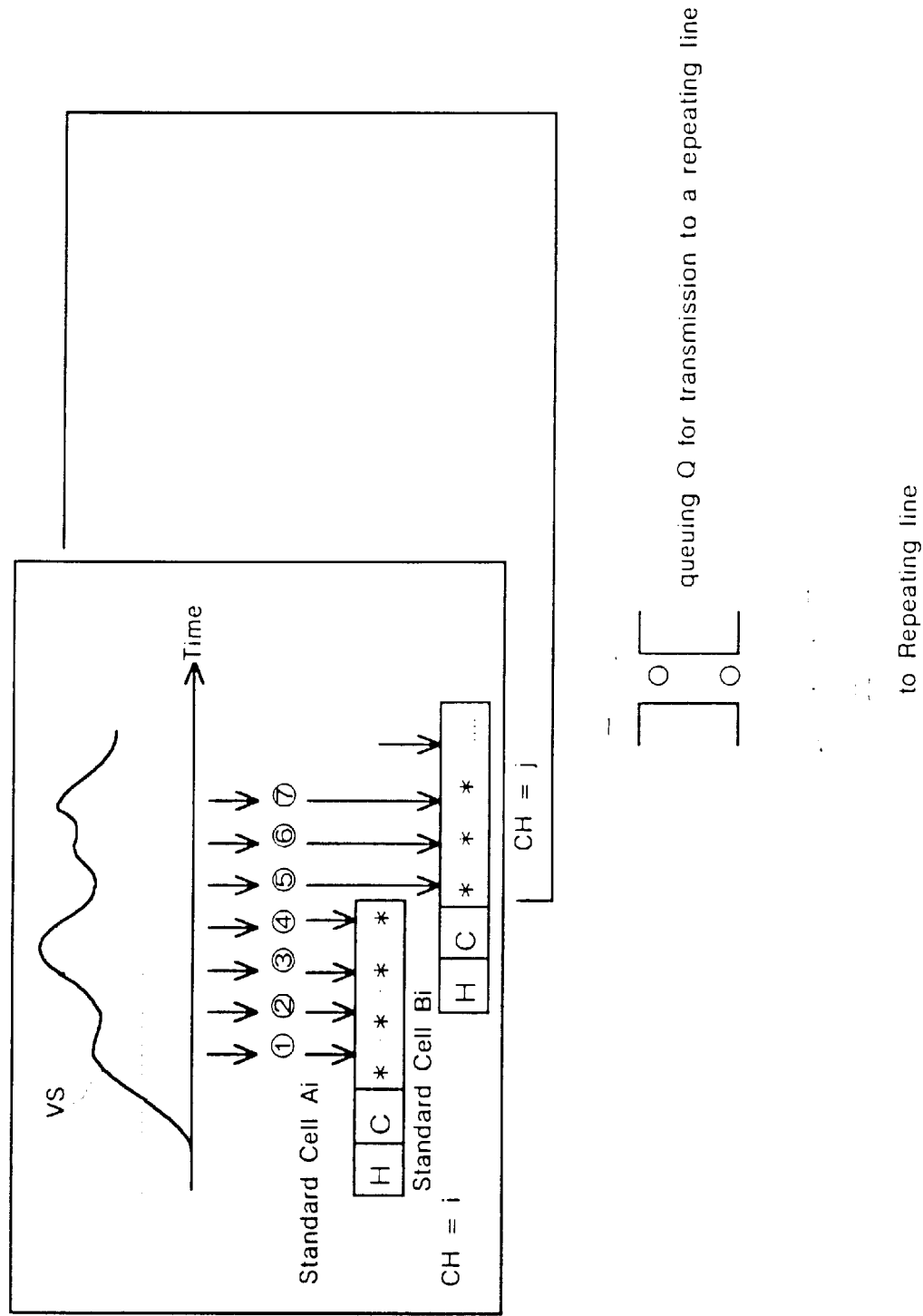
FIG. 2 shows a feature of the present invention.

FIG. 2 shows a feature of the present invention. In FIG. 2, the voice frames ①, ②, ③ . . . , which are made into short cells in every 10 ms of a talk-spurt from a rising time to a dropping time of a voice signal VS, are generated by the compression coder 30. Additionally, only voice frames of voice signals for the same channel are provided on a payload of 48 octets of one standard cell. Then, queuing for transmission to a repeating line is executed in a standard cell format. Thereby, a problem of the voice signal transmission delay can be solved.

In the example of FIG. 2, continuous voice frames ①, ②, ③, ④, of the same channel are provided on a standard cell Ai, and the following voice frames ⑤, ⑥, ⑦, ⑧ are provided on a standard cell Bi.

Figure 3:
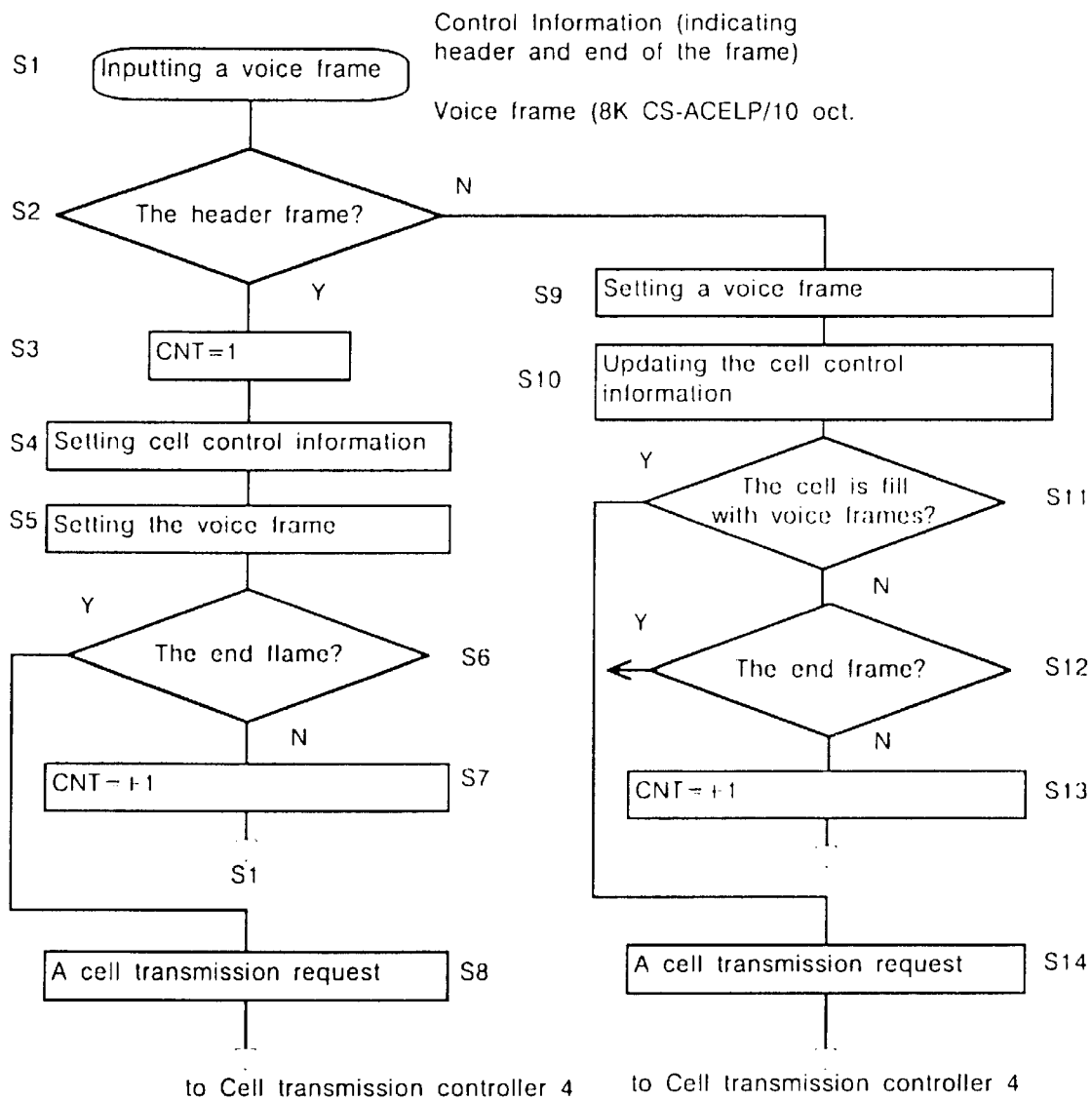
FIG. 3 is an operational flow chart of a cell assembling and disassembling controller 32.

FIG. 3 shows an operational flow chart of the cell assembling and disassembling controller 32 for controlling to assemble the voice frames, each of which is set to a short cell, into a standard cell. The controller 32 consists of a CPU, a counter, and a memory, which stores a control program. The CPU controls the control program, and then, the processes shown in the operational flow chart of FIG. 3 are executed.

In FIG. 3, the cell assembling and disassembling controller 32 receives control information, i.e., the header and the end of a frame, and voice frames obtained from the voice frame controller 31 (STEP S1).

Then, the controller 32 judges whether or not the voice frame is the header frame according to an existence of the indication of the header frame (STEP S2). When the controller 32 judges the frame is the header frame according to the indication, "1" is set to the counter (STEP S3). Then, cell control information, such as the header and the cell length, is set to a standard cell (STEP S4).

Next, the input voice frames are subsequently set to the standard cell (STEP S5). Further, it is judged whether or not the voice frame set to the standard cell is an end frame according to an existence of the indication of the end frame (STEP S6).

In other words, as explained above, one voice frame is formed in every 10 ms of the talk-spurt of the voice signal VS. Although the maximum four voice frames can be provided on one standard cell, there is a case where only one voice frame is provided.

If the voice frame is the end of the frame, a transmission request is transmitted to the cell transmission controller 4 (STEP S8). Then, the cell transmission controller 4 attaches a virtual path identifier (VPI) and a virtual channel identifier (VCI) on the transmission request, and transmits it.

Further, on the step S6, if the frame is not the end of the frame, the counter is incremented by "1", and then, the process is returned to the step S1. Then, the controller 32 waits for inputting a new voice frame.

On the other hand, on the step S2, if an inputted voice frame is not the header frame, the inputted voice frame is registered and set to the corresponding standard cell, similarly to the process on the step S4 (STEP S9). Then, as the voice frame is added, the control information of the voice frame is updated (STEP S10).

Further, it is judged whether or not the standard cell is full with voice frames (STEP S11). This judgement are executed by judging whether or not the counter value has reached to "4". In other words, when four voice frames are set in one standard cell, a cell transmission request is transmitted to the cell transmission controller 4 (STEP S14). Then, the cell transmission controller 4 attaches a virtual path identifier (VPI) and a virtual channel identifier (VCI) onto the transmission request and transmits it.

Alternatively, it is judged whether or not the voice frame added to the standard cell is the end frame, according to an existence of the indication of the end frame (STEP S12). If the voice frame is the end frame, the transmission request is transmitted to the cell transmission controller 4 (STEP S14). The cell transmission controller 4, then, attaches a virtual path identifier (VPI) and a virtual channel identifier (VCI) onto the transmission request, and transmits it.

On the step S12, if the voice frame is not the end frame, the counter is incremented by "1", and the process is returned to the step S1. Then, the CPU waits for inputting a new voice frame.

Figure 4:
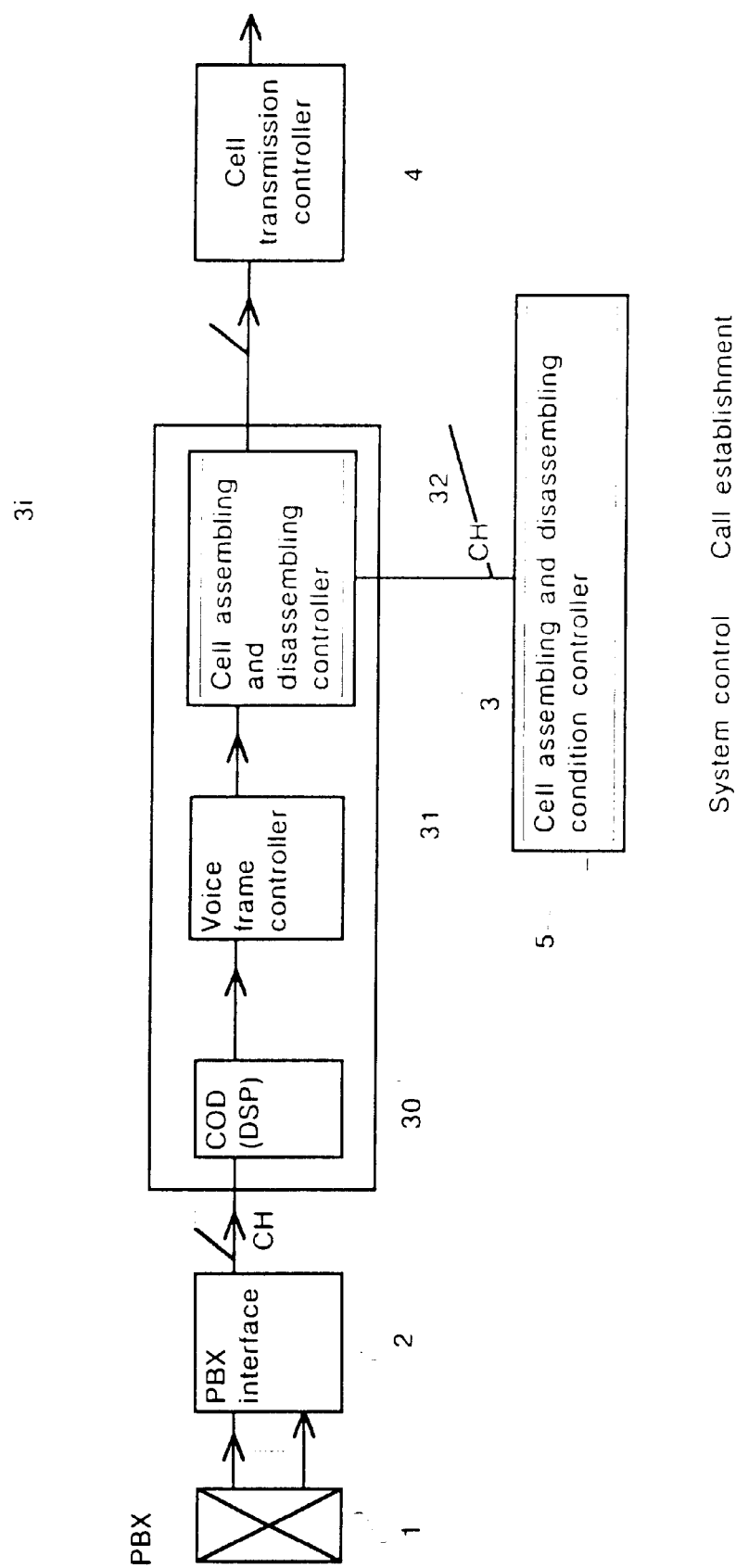
FIG. 4 is a structural block diagram of a second embodiment of the present invention.

FIG. 4 is a structural block diagram of a second embodiment of the present invention. It is a different point from the first embodiment of FIG. 1 that a system of the second embodiment of FIG. 4 has a cell assembling and disassembling condition controller 5.

Figure 5:
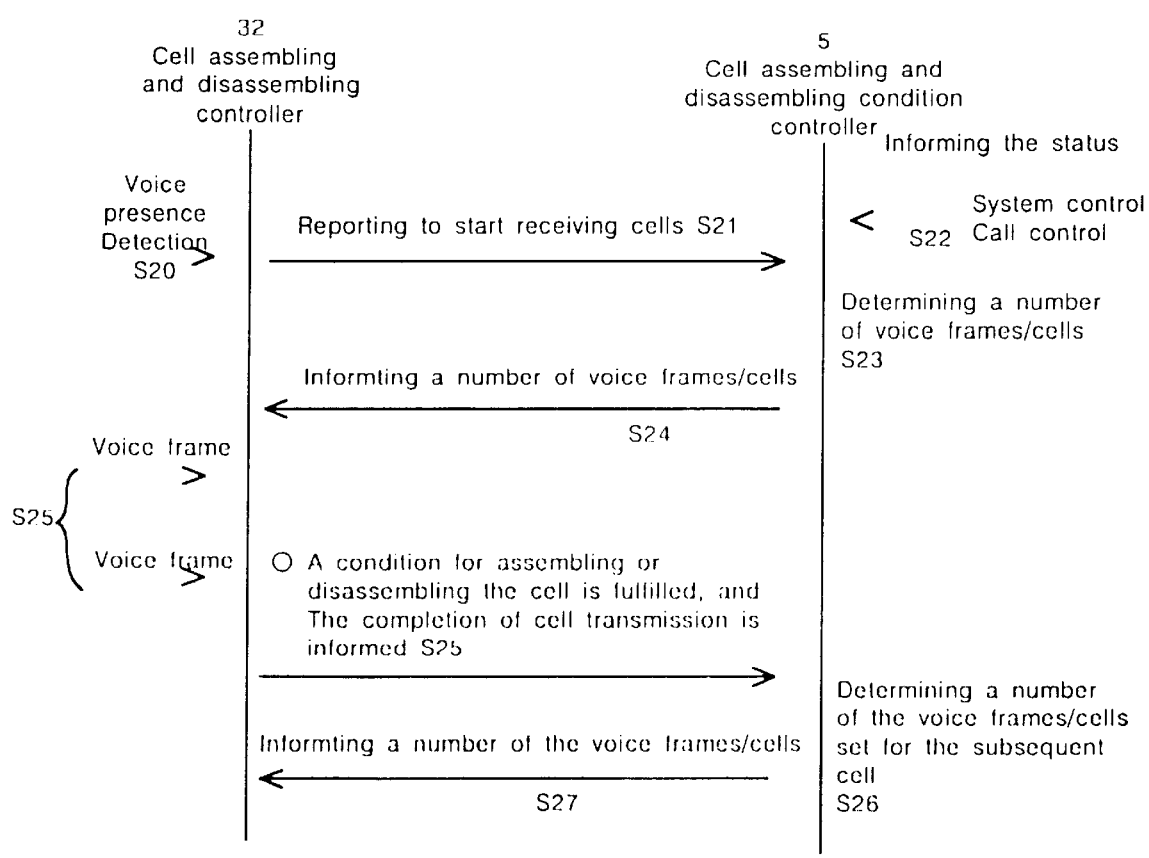
FIG. 5 is a sequential diagram of explaining a corporation between the cell assembling and disassembling controller.

FIG. 5 is a sequential diagram, which explain a corporation between the cell assembling and disassembling controller 32 and the cell assembling and disassembling condition controller 5. In FIG. 5, the voice frame controller 31 informs of voice presence, which is detected from a rising time of the talk-spurt, to the cell assembling and disassembling controller 32 (STEP S20).

When the voice frame controller 31 informs the detection of the voice presence to the cell assembling and disassembling controller 32 (STEP S20), the cell assembling and disassembling controller 32 reports the start of receiving cells to the cell assembling and disassembling condition controller 5 (STEP S21). On the other hand, a system controller and a call establishment controller, not shown in FIG. 5, have transmitted control data for determining a cell assembling and disassembling condition to the cell assembling and disassembling condition controller 5 by that time. The cell assembling and disassembling condition controller 5 stores the control data (STEP S22).

Therefore, the cell assembling and disassembling controller 5 determines a number of voice frames to be provided on one standard cell according to the stored control data for determining the cell assembling and disassembling condition (STEP S23), and informs the number to the cell assembling and disassembling controller 32 (STEP S24).

The cell assembling and disassembling controller 32 subsequently provides voice frames transmitted from the voice frame controller 31 on the payload of a standard cell until the transmitted voice frames become to fill the cell assembling and disassembling condition (STEP S25). When the number is reached to a number of voice frames set in one cell, which is prescribed according to the cell assembling and disassembling condition, the cell assembling and disassembling controller 32 transmits the cell to the cell transmission controller 4, and informs the completion of cell transmission to the cell assembling and disassembling condition controller 5 (STEP S25).

Accordingly, the cell assembling and disassembling condition controller 5 determines a number of the voice frames set for the subsequent cell (STEP S26), and informs the number to the cell assembling and disassembling controller 32. The cell assembling and disassembling controller 32 further provides generated voice frames on the payload of a cell according to the informed cell assembling and disassembling condition. The processes are repeated between the cell assembling and disassembling controller 32 and the cell assembling and disassembling condition controller 5 during the talk-spurt.

Figure 6:
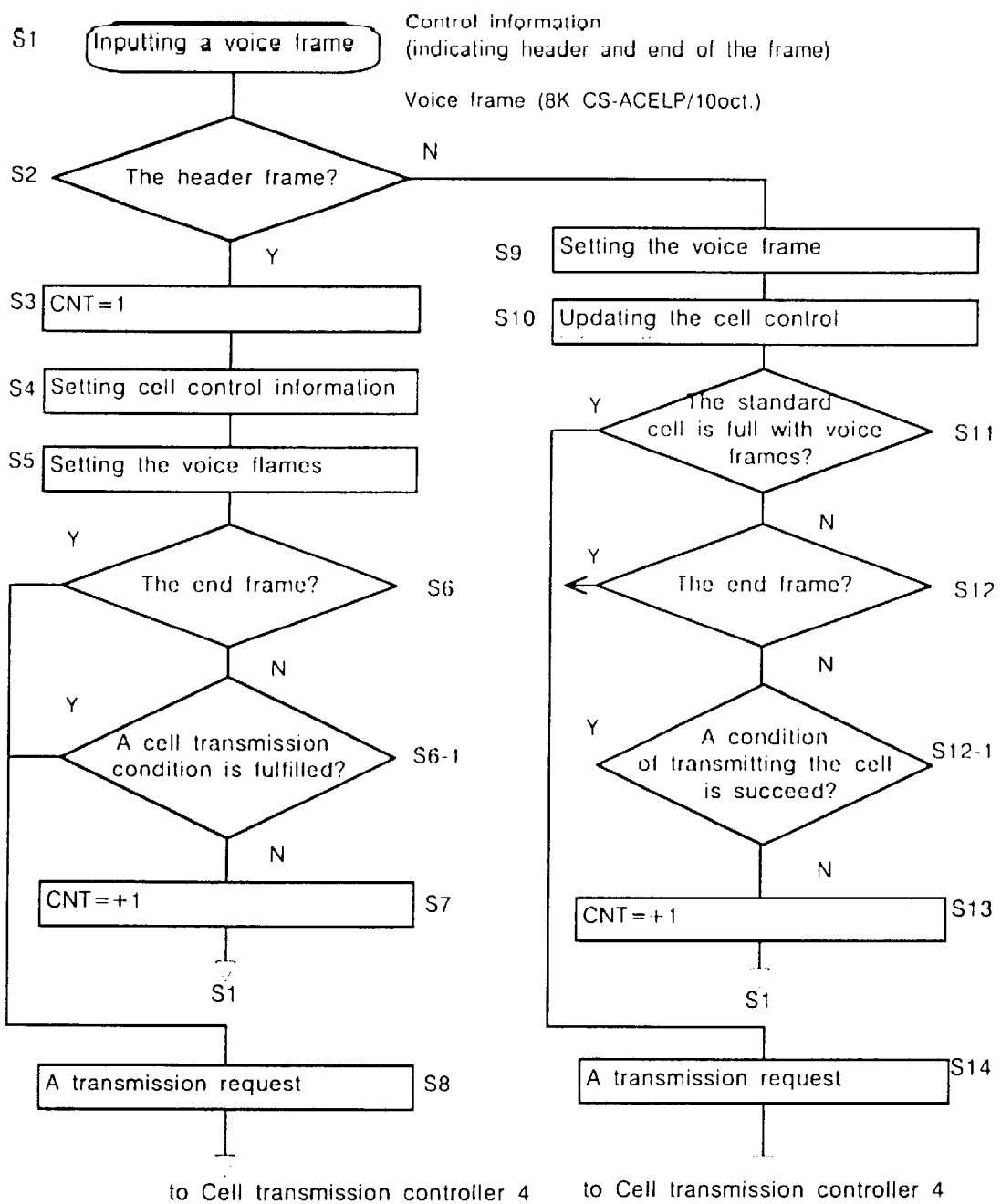
FIG. 6 is an operational flow chat of the cell assembling and disassembling controller 32 in the second embodiment corresponding to FIG. 3.

FIG. 6 shows an operational flow chart of the cell assembling and disassembling controller 32 in the second embodiment corresponding to FIG. 3. Therefore, although the basic operations are the same as those shown in the operational flow chart of FIG. 3 of the first embodiment, it is different point from the first embodiment to insert a step of judging whether or not a cell transmission condition has been established after steps S6 and S16.

In other words, on the step S6, when the voice frame is not the end frame, it is judged whether or not the number of voice frames fulfills the cell transmission condition, i.e., the number is reached to the number of the voice frames set in one cell (STEP S6-1). Simultaneously, when the voice frame is not the end frame, on the step S12, it is judged whether or not the number of voice frames fulfills the cell transmission condition, i.e., the number is reached to a number of the voice frames set in one cell (STEP S12-1).

In both steps, when the cell transmission condition is fulfilled, a cell transmission request is transmitted to the cell transmission controller 4 (steps S8 and S14).

In here, in a case where plural voice channels are accommodated outputs of the voice cells between the plural channels are congested, and an ATM cell transmission system is applied to a sub-line group concentration mechanism at a low speed, dispersion of delay times of cell transmission on other lines are increased because of a cell concentration to a specific line. To control this, it is necessary to adjust timings of transmitting cells between channels.

FIGS. 7A and 7B are diagrams for explaining one embodiment according to the present invention. To cope with he necessity, a number of voice frames provided on the first cell in each voice frame is changed, so that timings of transmitting cells may be shifted after the first cell. A structural block diagram of a voice cell transmitting system employing this embodiment is the same as that of the system shown in FIG. 4, basically, and therefore, the block diagram will be now omitted here.

FIG. 7A shows that four voice frames are provided on one cell when one voice frame is 10 ms on employing a 8K CS-ACELP compression method, and therefore, a time of assembling one cell becomes 40 ms.

FIG. 7A further shows that a timing for a header frame in the voice frames forming one cell is equivalently allocated to each voice channel Ch#1, Ch#2, Ch#3 . . , and thereby, concentration of cells on one specific line and cell transmission delays generated on other lines can be avoided.

In FIG. 7B, a time from a rise time of the talk-spurt to a soundless state is shown as about 400 ms. Therefore, when employing the above-described 8K CS-ACELP compression method, one cell is formed of four voice frames, and therefore, the time of 400 ms is equal to a capacity of 10 cells.

In FIG. 7B, (a) means a timing of outputting the voice frame, and (b) means a timing of assembling cells. Especially, four situations from case 0 to case 3 are shown as a timing (b) of assembling cells.

For example, the timing (b) is a time of outputting the fourth voice frame in the case 0. Therefore, the header cell includes four voice frames, and the end cell includes only one cell. Alternatively, the timing (b) is a time of outputting the second voice frame in the case 2, and therefore, the header cell includes two voice frames and the end cell has three voice frames.

Therefore, it becomes possible to take a preference of a timing of transmitting a cell for only a specific channel, and prevent from generating cell transmission delays on the other channels, by setting timings of assembling cells for each channel.

Figure 8:
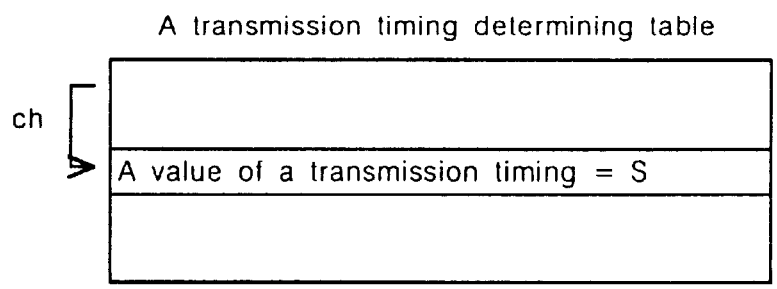
FIG. 8 illustrates a transmission timing determination table.

Therefore, a transmission timing determining table shown in FIG. 8 is provided on the cell assembling and disassembling condition controller 5. A transmission timing value S corresponding to a channel is obtained from the transmission timing determination table, according to the corresponding channel number ch of the channel.

Figure 9:
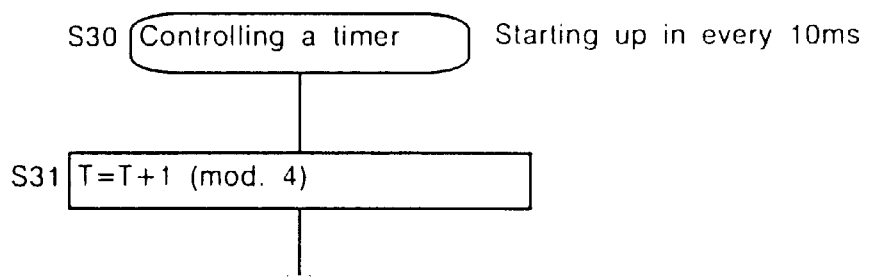
FIG. 9 is a first operational flow chart of the cell assembling and disassembling controller 5.

Further, the cell assembling and disassembling controller 5 controls the timer in every 10 ms, and counts the counter by "1", according to a first operational flow chart of the cell assembling and disassembling condition controller 5 shown in FIG. 9.

Figure 10:
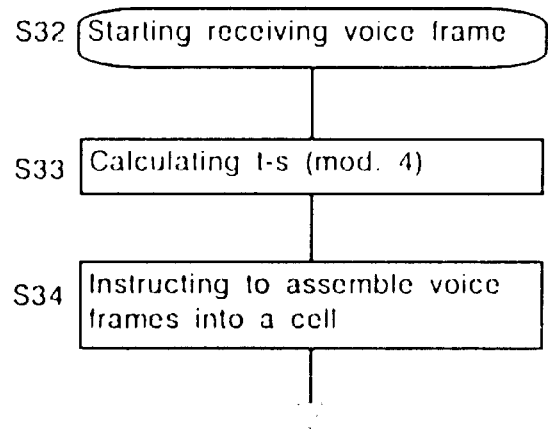
FIG. 10 is a second operational flow chart of the cell assembling and disassembling controller 5.

When the cell assembling and disassembling condition controller 5 starts receiving the voice frame according to the second operational flow chart of the cell assembling and disassembling controller 5 shown in FIG. 10 (STEP S32), an elapsed time (t−S) till the transmission timing value S, which is corresponding to the channel obtained in the transmission timing determination table, is calculated, at first (STEP S33).

When reaching to the calculated time, the cell assembling and disassembling condition controller 5 instructs the cell assembling and disassembling controller 32 to assemble voice frames of a corresponding channel received till then into one cell (STEP S34). After that, the cell assembling and disassembling controller 32 assembles four voice frames relating to the channel into a cell and transmits them to the cell transmission controller 4.

Figure 11:
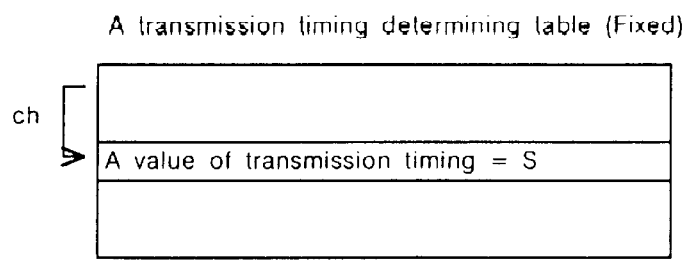
FIG. 11 shows an embodiment of a method for setting the transmission timing determination table shown in FIG. 8, and shows an example where the transmission timing is fixed in each channel.
Figure 12:
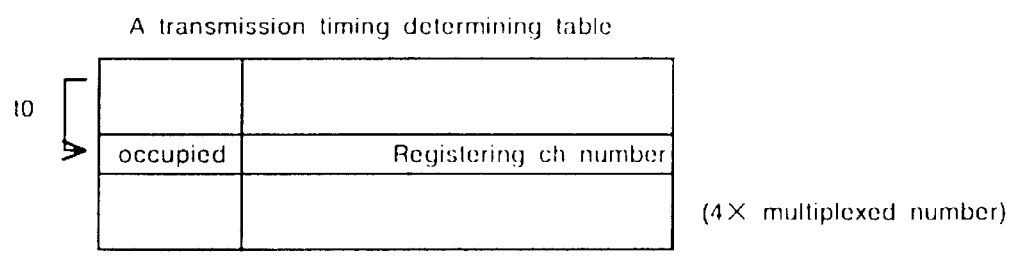
FIG. 12 shows an embodiment of a method for setting the transmission timing determination table shown in FIG. 8, and shows an example where transmission timing determination is registered, a number of minimum voice flames are adjusted.

FIGS. 11 and 12 show concept of an embodiment of the method for setting the transmission timing determination table of FIG. 8. In an embodiment of FIG. 11, a timing of transmitting a cell is fixed for each cell.

Figure 13:
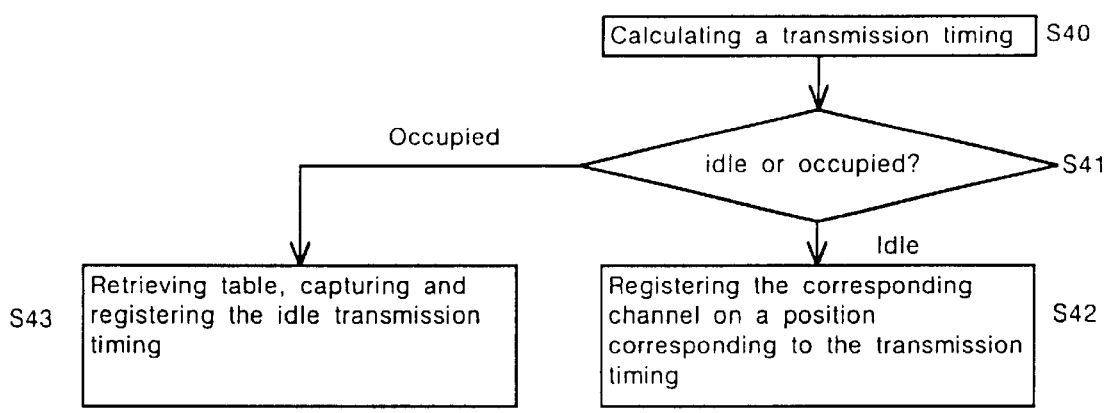
FIG. 13 is an operational flow chart corresponding to the example of FIG. 12.

On the other hand, in an embodiment of FIG. 12, the determination of the transmission timing is registered, and the minimum number of the voice frames is adjusted, for example. As shown in the operational flow chart of FIG. 13 corresponding to that of FIG. 12, the cell transmission controller 4 obtains a transmission timing to by the following equation from a currently used timer value t (STEP S40):

$$t0 = t + 40 \text{ ms/mod.4}$$

The transmission timing determination table of FIG. 12 is referred based on the obtained transmission timing to, and it is checked that a position of the table is idle or occupied (STEP S41). If the position of the table corresponding to the transmission timing to is idle, the corresponding channel number is registered (STEP S42). If not, a position of referring the table is retrieved in a forward direction, and an idle transmission timing is captured, and then, the channel number is registered (STEP 43).

Then, a table area of four times of a number of channels should be prepared in the transmission timing determination table of FIG. 12.

Figure 14:
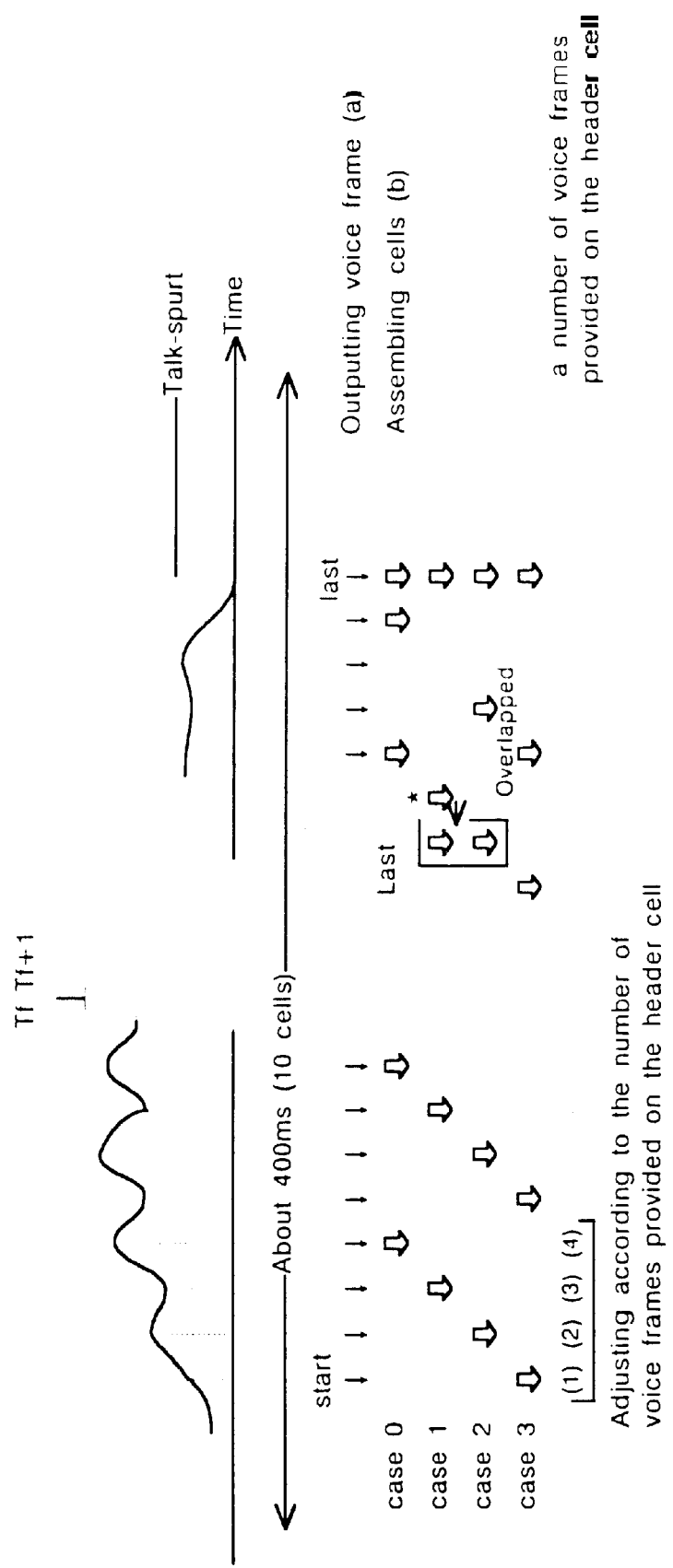
FIG. 14 is an explanatory diagram of a problem that a conjunction with other channels occurs when a Talk-spurt is finished earlier than a scheduled timing, and a signal is assembled as it is and is transmitted.

FIG. 14 shows a problem that a conjunction with other channels occurs when the talk-spurt is finished either than the scheduled time, the voice frames are assembled into cells, and the cells are transmitted as they are. In other words, when the talk-spurt of the channel, in which a cell is assembled at a timing of the case 1, is finished at time Tf, in FIG. 14, the voice frames to the end voice frame are assembled into a cell.

Therefore, the time of assembling into a cell is moved from the original time Tf+1 to a time Tf of generating the end voice frame, and then, the cell assembling is completed. However, the time is overlapped to the original time Tf+1, which is equal to the timing for a channel, to which assembling to a cell is executed at the timing of the case 2.

To overcome such the problem, transmission of a cell is delayed to the originally assigned timing for transmitting the cell, even if the cell includes the end voice frame. The control is executed by the cell assembling and disassembling condition controller 5 of FIG. 4.

Figure 15:
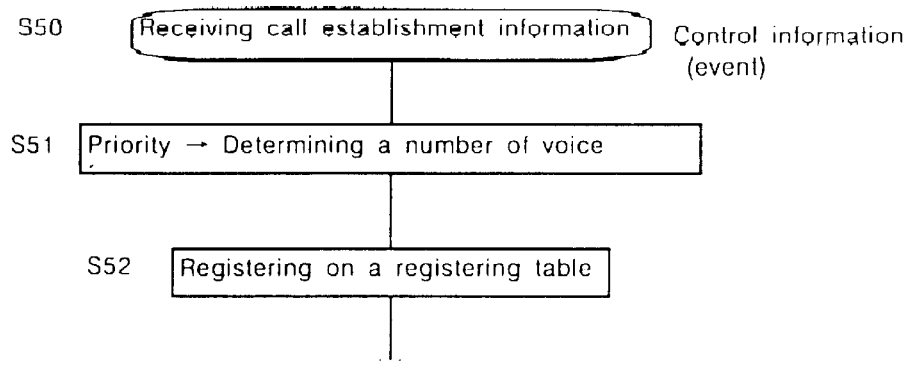
FIG. 15 shows an operational flow chart of a cell assembling and disassembling condition controller 5, which variably determines a number of voice frames generally provided in one cell according to a priority relating to the tone.
Figure 16:
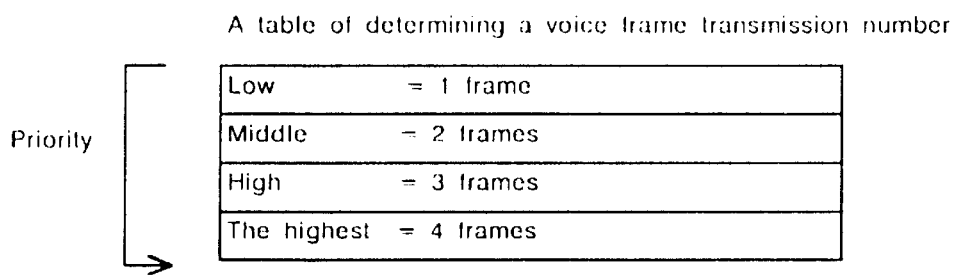
FIG. 16 shows an embodiment of a table of determining a number of transmitting voice frames, which is corresponding to FIG. 15.
Figure 17:
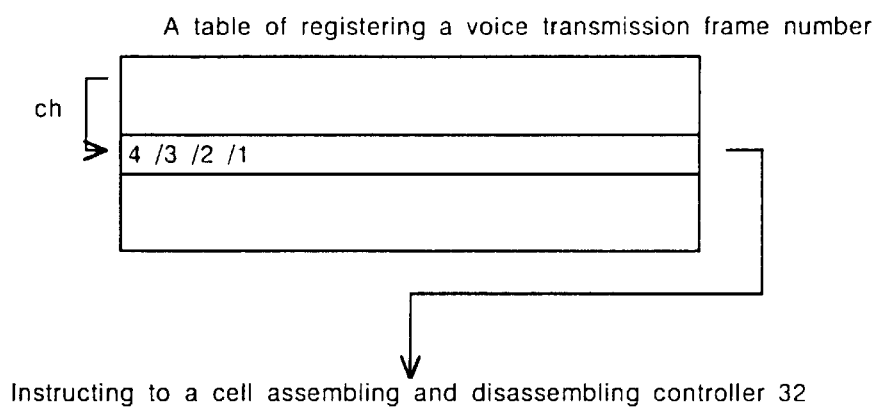
FIG. 17 is an embodiment of a table for registering a number of transmitting a number of voice frames, which is corresponding to FIG. 15.

FIGS. 15 through 17 are explanatory diagrams of other embodiments according to the present invention. In other words, a number of the voice frames provided on one cell is variably determined according to a priority relating to the tone quality, on a specific communication For example, more number of voice frames are provided on one cell of a channel having a source where tone quality is serially taken, while less number of voice frames are provided on channels not having the source.

Therefore, when the cell assembling and disassembling condition controller 5 receives call establishment information in FIG. 4 (FIG. 15: STEP S50), the controller 5 reads out a number of the corresponding frames from a table where a number of voice frames provided on a cell is registered in every priority, as shown in FIG. 16, according to the priority of the call (FIG. 15: STEP S51). Then, the number of the voice frames to be read out is registered in a table of registering a voice frame transmission number, shown in FIG. 17, corresponding to each channel.

Accordingly, the cell assembling and disassembling condition controller 5 can read out the number of the voice frames on the channel from the table for registering the voice frame transmission number, shown in FIG. 17, and inform it to the cell assembling and disassembling controller 32. Thereby, the cell assembling and disassembling controller 32 can variably change a number of voice frames to be assembled and disassembled, according to the voice characteristic of each channel.

Figure 18:
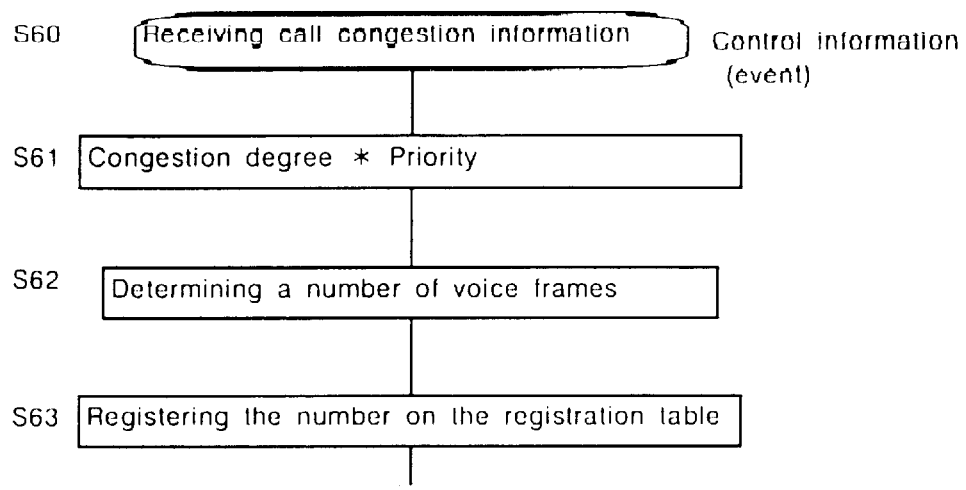
FIG. 18 is an operational flowchart of a cell assembling and disassembling condition controller 5 in the embodiment in which a number of voice frames variably provided in one cell according to a degree of call congestion and a priority of the call.

When congesting calls in this system, it becomes more important to reduce a cell traffic amount than a tone quality. Therefore, in the embodiment of the present invention, it is possible to variably increase a number of voice frames provided on one cell, according to the degree of the call congestion and the priority of the call, as shown in the flow chart of FIG. 18, a table T1 for retrieving a degree of importance and a table T2 for determining a voice frame transmission number of FIG. 19.

Figure 19:
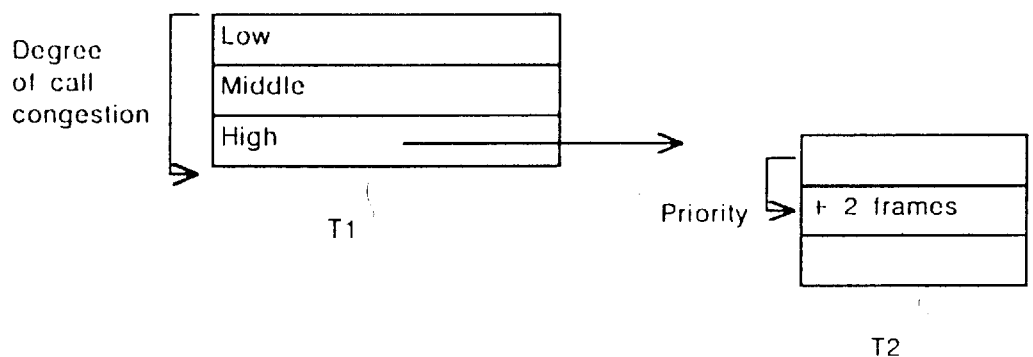
FIG. 19 is an explanatory diagram of a table T1 of retrieving a degree of the importance corresponding to the call congestion degree and a table of determining a number of transmitting voice frames.
Figure 20:
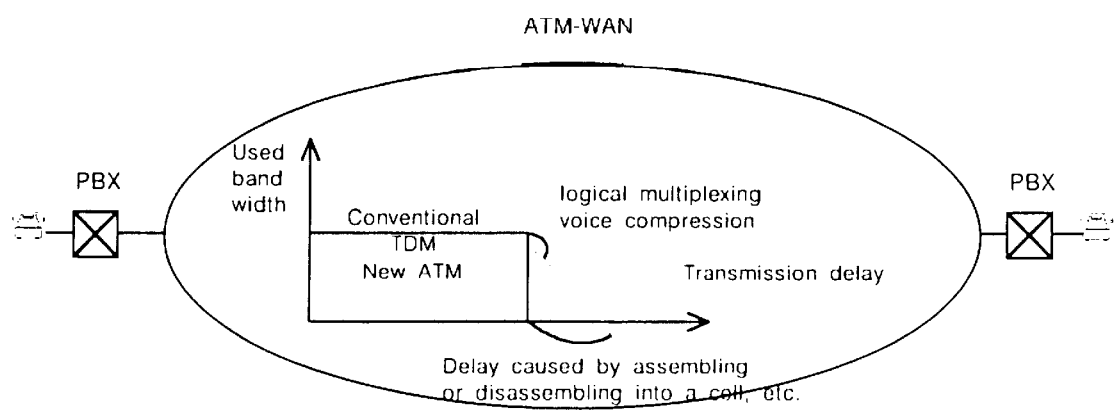
FIG. 20 is an explanation diagram of a problem when replacing the TDM network into a new network.
Figure 21:
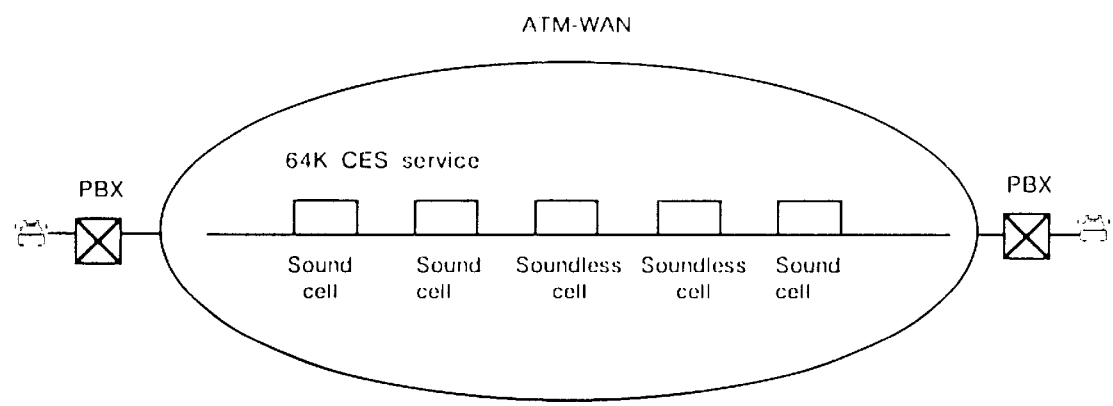
FIG. 21 is an explanatory diagram of a circuit emulation service (CES).
Figure 22:
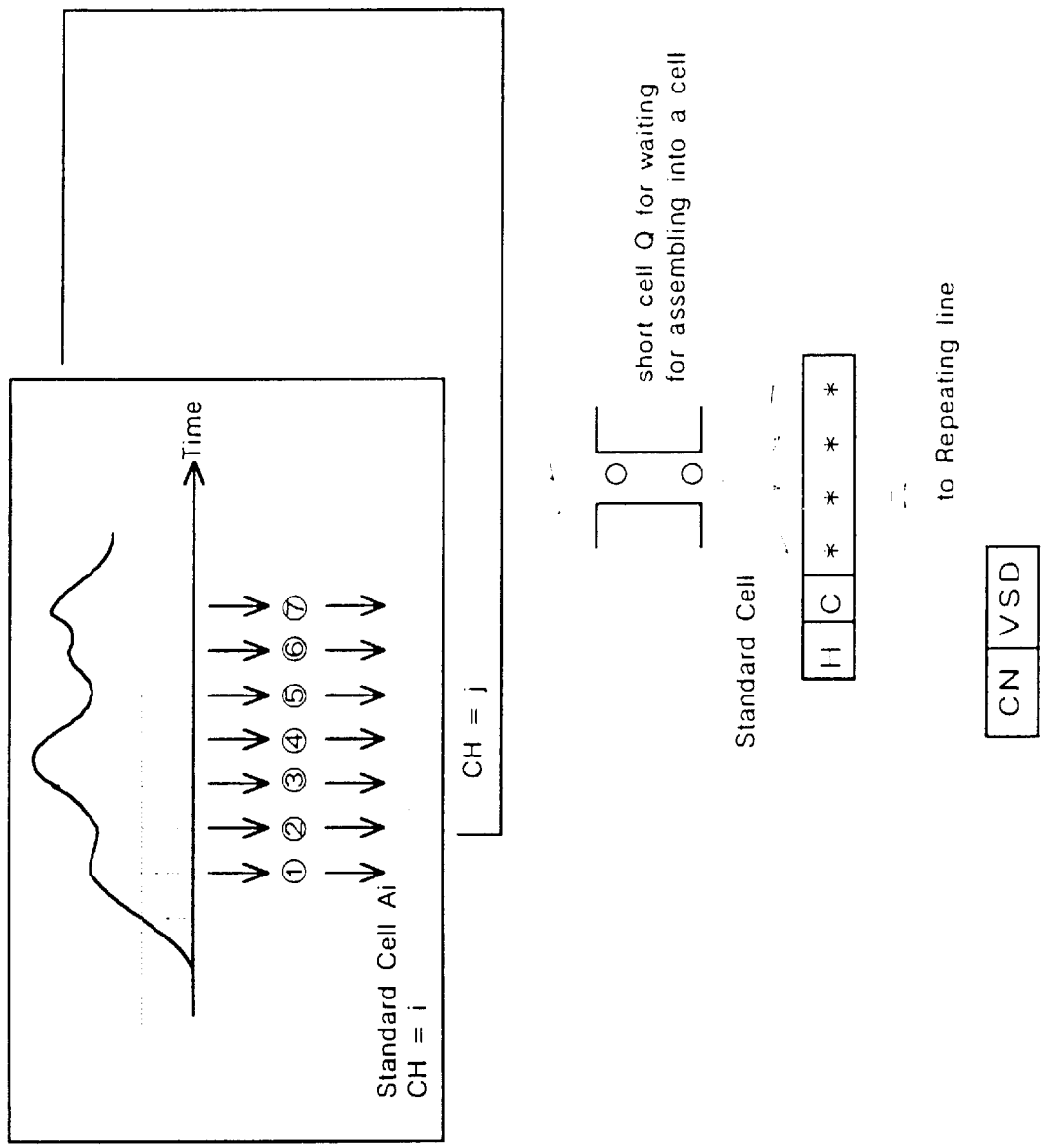
FIG. 22 is an explanatory diagram of a voice & telephony over ATM (VTOA) technique.

In other words, a table T1 for retrieving a degree of importance corresponding to a degree of call congestion and a table T2 for determining a voice frame transmission number, similarly to FIG. 16, are prepared, as shown in FIG. 19. When the cell assembling and disassembling condition controller 5 receives call congestion information on call establishment (STEP S60), the tables T1 and T2 are referred according to the degree of the call congestion (STEP S61). Then, a number of the voice frames provided on one cell is registered in the referred table T1 for retrieving a degree of importance.

Additionally, the table T2 is referred according to the information of priority included in the control information. A number of voice frames, which is added according to the priority, is registered in the table T2 for determining a number of transmitting the added voice frames.

Then, a number of voice frames provided on one cell is determined by adding the number of voice frames provided on one cell, which is registered in the table T1 and the number of the added voice frames, which is registered in the table 2 (STEP S62).

The determined number of voice frames is registered in a table for registering a voice frame transmission number of FIG. 17 (STEP S63).

Accordingly, the cell assembling and disassembling controller 5 can read a number of voice frames of the channel from the table for registering a voice frame transmission number of FIG. 17, and inform the number to the cell assembling and disassembling controller 32. Thereby, the cell assembling and disassembling controller 32 can variably change a number of voice frames to be assembled into a cell in every channel, corresponding to a degree of importance or the priority.

As is explained according to the embodiments, it is possible to provide a voice cell transmission method, in which a time of transmission delay can be minimized when transmitting a voice cell, having a VTOA architecture, and a system using the method.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. Voice transmissions method, in an ATM transmission system for transmitting voice traffic, which is compressed, and is provided on a payload of a standard cell in short cell formats, comprising the steps of:

forming voice frames in predetermined periods as short cells each within a talkspurt from a rising time and a dropping time of one voice channel; and providing the formed voice frames continuously on the payload of the standard cell.

2. The method according to claim 1, wherein a number of the voice frames of the one voice channel provided on the standard cell are dynamically varied according to a status of the network.

3. The method according to claim 1, wherein when communications for plural voice channels are performed, a number of the voice frames including a header frame for the talk-spurt provided on the payload of the standard cell is differed in each of the plural voice channels.

4. The method according claim 1, wherein when communications for plural voice channels are performed, a number of voice frames provided on the payload of the standard cell is fixed in each of the plural voice channels.

5. The method according to claim 1, wherein a number of the voice frames provided on the payload of the standard cell in each of the plural voice channels is differed in every talk-spurt.

6. The method according to claim 3, wherein when the voice frame include an end voice frame, and there are extra spaces for providing additional voice frames on the payload of the standard cell, the voice frames provided on the standard cells are not taken in preference to standard cells of other channels.

7. The method according to claim 1, wherein a number of voice frames corresponding to one voice channel provided on one standard cell is dynamically varied according to a priority of a specific call.

8. An ATM transmission system, for transmitting a voice traffic, which is compressed, and is provided on a payload of a standard cell in short cell formats, comprising:

plural cell assembling and disassembling circuits, each corresponding to one of a plurality of voice channels for receiving a voice signal of one of a plurality of voice channels; and a cell transmission controller for controlling to transmit cells output from the plural cell assembling and disassembling circuits in a predetermined order, wherein each of the plural cell assembling and disassembling circuits include a voice frame controller, which forms voice frames in every predetermined period within a talk-spurt having a rising time and dropping time of one voice channel, and a cell assembling controller, which continuously provides the formed voice frames on the payload of the standard cell.

9. The system according to claim 8, further comprising:

a cell assembling and disassembling controller for defining cell assembling conditions for the cell assembling and disassembling controller, wherein the cell assembling and disassembling condition controller dynamically varies and determines a number of the voice frames corresponding to the voice channel provided on one standard cell by the cell assembling and disassembling controller, according to the status of the network.

10. The system according to claim 9, wherein when communications for plural voice channels are performed, the cell assembling and disassembling condition controller makes a number of voice frames including a header frame for the talk-spurt provided on the payload of the standard cell including a header frame of the talk-spurt be differed, in each of the plural voice channels.

11. The system according to claim 9, wherein the cell assembling and disassembling condition controller fixes a number of voice frames including a header for the talk-spurt provided on the payload of the standard cell in each of the plural voice channels.

12. The system according to claim 9, wherein the cell assembling and disassembling condition controller differs a number of voice frames provided on the payload of the standard cell in each of the plural voice channels, in every talk-spurt when communications for plural voice channels are performed.

13. The system according to claim 9, wherein the cell assembling and disassembling condition controller the voice frames provided on the standard cells in preference to standard cells of other channels when the voice frames include an end voice frame, and there is extra space for providing voice frames on the payload of the standard cell.

14. The system according to claim 8, further comprising:

a cell assembling and disassembling condition controller for defining cell assembling condition for the cell assembling and disassembling controller, wherein the cell assembling and disassembling condition controller dynamically varies a number of the voice frames corresponding to the one voice channel provided on one standard cell by the cell assembling and disassembling controller according to priority of a specific call.

* * * * *